(12) United States Patent
Veil

(10) Patent No.: US 7,677,455 B2
(45) Date of Patent: Mar. 16, 2010

(54) SAFETY MARKING

(75) Inventor: Jürgen Veil, Dresden (DE)

(73) Assignee: Koenig & Bauer AG, Wurzburg (DE)

( * ) Notice: Subject to any disclaimer, the term of this patent is extended or adjusted under 35 U.S.C. 154(b) by 1028 days.

(21) Appl. No.: 11/312,810

(22) Filed: Dec. 20, 2005

(65) Prior Publication Data

US 2006/0163371 A1 Jul. 27, 2006

(30) Foreign Application Priority Data

Jan. 27, 2005 (DE) .................. 10 2005 003 839

(51) Int. Cl.
*G06K 7/10* (2006.01)
(52) U.S. Cl. ...................... 235/454; 235/494
(58) Field of Classification Search .......... 235/468, 235/454, 494; 283/88, 89
See application file for complete search history.

(56) References Cited

U.S. PATENT DOCUMENTS

| | | | |
|---|---|---|---|
| 3,834,925 A | | 9/1974 | Matsumura et al. |
| 5,629,512 A | * | 5/1997 | Haga .................. 235/468 |
| 6,343,745 B1 | * | 2/2002 | Bohm et al. ............. 235/493 |
| 6,474,695 B1 | * | 11/2002 | Schneider et al. .......... 283/72 |
| 6,491,324 B1 | * | 12/2002 | Schmitz et al. ............ 283/82 |
| 7,252,239 B2 | * | 8/2007 | Braun ................. 235/488 |
| 7,286,291 B2 | | 10/2007 | Benedikt et al. |

2002/0127339 A1  9/2002 Schwitzky et al.

FOREIGN PATENT DOCUMENTS

| | | |
|---|---|---|
| DE | 23 28 821 B2 | 2/1974 |
| DE | 22 18 323 B2 | 7/1974 |
| DE | 100 57 641 A1 | 5/2002 |
| DE | 100 57 642 A1 | 5/2002 |
| DE | 100 57 643 A1 | 5/2002 |
| DE | 101 24 630 A1 | 11/2002 |
| EP | 1 500 519 A2 | 1/2005 |
| JP | 63-135283 A | 6/1988 |
| JP | 2001-58498 A | 3/2001 |
| WO | WO 93/06942 A1 | 4/1993 |
| WO | WO 2004/096570 A2 | 11/2004 |

* cited by examiner

*Primary Examiner*—Ahshik Kim
(74) *Attorney, Agent, or Firm*—Goodwin Procter LLP

(57) ABSTRACT

A safety marking and a method for producing a safety marking according to the CIT principle for printed areas are provided. The safety marking is a two-dimensional or three-dimensional image, the image elements of which are coded in a size and arrangement, which cannot be perceived by the human eye and are visible only with the help of optical decoders. A printable safety marking is created according to the CIT principle, which can be implemented at little expense at any place of a material being printed and therefore also in areas that are not rastered. This is accomplished by a coding of the image elements by locally different reflection properties of a lacquer coating formed from at least two different lacquer layers, the coding being independent of the chrominance and tonal value of the printed area.

11 Claims, 1 Drawing Sheet

SAFETY MARKING

FIELD OF THE INVENTION

The invention relates to a safety marking and to a method for producing a safety marking according to the CIT principle for printed surfaces, the safety marking being a two-dimensional or three-dimensional image, the image elements of which are coded in a size and an arrangement, which cannot be perceived by the human eye and are visible only with the help of optical decoders

BACKGROUND OF THE INVENTION

Safety markings are understood to be markings on goods and products or their packaging, which cannot be forged or, at the very least, are very difficult to copy, and the absence of which is intended to disclose unauthorized imitations or copies (forgeries). These include watermarks, logos, serial numbers, special inks or hologram images.

However, the known safety markings do not offer adequate protection against imitations or are expensive to produce or cannot be used everywhere. Moreover, when previously customary markings are used, the checking of the authenticity is complicated and expensive. Either test pieces have to be investigated or laboratory tests to analyze the material or image must be carried out. Frequently, the results are not reliable.

The production of safety markings on the packaging of goods or on the goods themselves by the CIT principle ("Concealed Image Technologies") is suitable for checking the genuineness of a product in situ easily and quickly. The safety markings are two-dimensional or three-dimensional images, which because of the small size and the arrangement of the image elements, are not visible to the human cyc ("hidden images") in printed areas. These hidden images can be reproduced only at great expense, if at all, since scanners cannot detect the coded image information because of the small size (less than 50 µm), the variable point or line frequency and the variable alignment. An optical encoder (lens), which matches only the respective hidden image according to the key-lock principle, is required to make such markings visible. The 3D CIT technology employs 1-30 µm wide and 1-50 µm deep depressions, which are embossed or produced by laser technology and code image information due to their different reflection angles. The WO 2004/096570 A2 discloses a method for producing embossed 3D hidden images. The image information is disposed at lines with a frequency of 1000 L/inch with a particular alignment. However, 3D CIT can be used only with plastic film or metal foil and is therefore limited. 2D CIT images can be produced with different printing methods such as offset printing, gravure printing or flexographic printing. The preliminary image files, created for printing product packaging, for example, are manipulated pixelwise or linewise by specialized companies, so that the image information for the CIT safety marking remains hidden to the eye. Slight chrominance or shade differences from the surrounding area arc used for coding purposes. It is a disadvantage of the known 2D CIT methods that they can be employed only within rastered image data. In full tone areas, which are of great importance for the printing of packaging material, it has, until now, not been possible to implement the hidden image method.

It is therefore an object of the invention to create a printable safety marking according to the CIT principle which can be implemented at little expense at any place of a material being printed and therefore also in areas that are not rastered.

BRIEF SUMMARY OF THE INVENTION

Pursuant to the invention, this objective is accomplished by a safety marking with the distinguishing features of claim 1 and by a method for producing such a safety marking with the distinguishing features of claim 11. Advantageous developments of the inventive solution are the object of the dependent claims.

The invention has the advantage that, due to the integration of the coded image (inscription, logo, . . . ) in a lacquer layer, the possibilities for using the safety markings are almost unlimited and completely independent of the chrominance and tonal value of the printed areas and can therefore also be disposed in full tone areas. In order to improve the visual impression, to protect against wear and to improve the further processing properties, printed materials are increasingly lacquered. This is the case particularly for package printing, the main area of application of the proposed solution, since the gloss, produced by lacquering, makes the printed products appear to be more valuable and draws more attention to the product. The color of high-gloss areas also appears to be more intensive. Accordingly, the implementation of safety markings in a lacquer layer practically does not represent any limitation or an additional expense for its realization, since at least package printing machines have available coating units (specially constructed coating units for lacquer layers of great thickness up to approximately 8 µm) or at least printing units (printing units used as coating units for lacquer layers of lesser thickness).

BRIEF DESCRIPTION OF THE DRAWING

The various embodiments of the invention are explained in greater detail with reference to the drawings.

DETAILED DESCRIPTION OF THE EMBODIMENTS

Figure 1A:
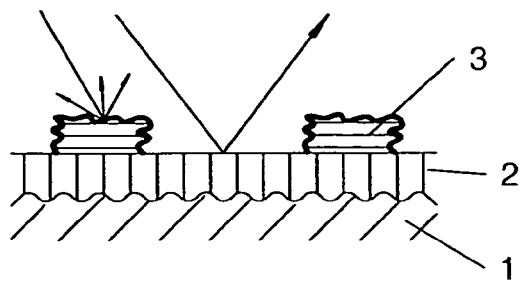
FIG. 1a-1b show image coding with a matte and a high-gloss lacquer.
Figure 1B:
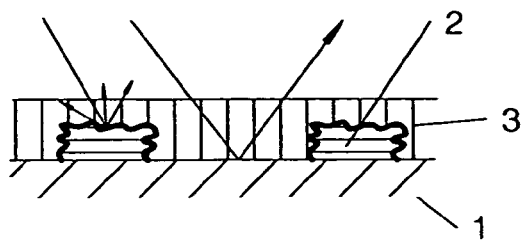

Pursuant to the invention gloss or transparency differences within a lacquered surface are used to code the CIT image of the safety marking. Gloss is a measure of the roughness of the reflection surface and of the light reflected at the lacquer surface under the emergence angle. Gloss characterizes the reflection properties of the surface of a layer of lacquer. Glossy surfaces (glossy lacquers) have a low roughness and reflect almost the whole of the incident light in a direction specified by the reflection angle. Rough surfaces (matte lacquers) reflect incident light diffusely and therefore appear to be brighter than glossy surfaces when viewed at an angle differing from the angle of reflection. The brightness differences or contrast differences between glossy and matte regions of the surfaces of a lacquer, arising from the different reflection properties, are used pursuant to the invention for coding and decoding the CIT images.

In principle, the same effect arises when lacquers with different transparency are used, the only difference being that in the case of less transparent lacquers, the reflection takes place additionally al the lacquer particles embedded in the lacquer layer. Basically however, this leads to reflection effects, which are the same as those at a rough surface. The examples therefore are related in a non-limiting manner only to lacquers with different degrees of gloss. Equivalent solutions are also possible with lacquers of different transparency.

Details, which relate to coding algorithms, are not an object of the proposed solution. The explanation of the inventive solution is therefore limited to the possibilities of forming highly resolving gloss differences in a lacquer coating.

Since the size of the image elements of the safety marking, which are to be implemented "invisibly" in the lacquer layer, is so small, that it is below the resolving capability of the human eye, that is, smaller than approximately 50 µm, a substrate with a surface of constant roughness and constant shade, which is as uniform as possible, is preferred. For this reason, safety markings are to be disposed preferably in printed regions, which receive a full surface application of a printing ink. As a result, irregularities in the surface of the printed material are covered and constant drying or curing conditions for subsequent lacquer applications are created.

At least three variations are suitable for producing the locally differentiated reflection properties. The first variation consists of the sequential application of two lacquers of different degrees of gloss (different transparency). The second and third variations are based on producing roughnesses selectively by physical and chemical reactions at the interfaces between different lacquers. Since lacquers with different degrees of gloss, that is, different surface roughnesses, are used for the inventive coding of the hidden images, a smooth substrate is a prerequisite. If the surface, in which the hidden image is to be disposed, is already primed in full tone with a glossy paint, the additional application of a layer of glossy lacquer is not required (FIGS. 1b, 2b, 2d, 3b). If not, the matte paint is to be coated with a glossy lacquer, which, for individual variations of image generation, interacts with a second lacquer (FIGS. 1a, 2a, 2c, 3a).

Variation 1

The application of at least one layer 2 of the lacquer in a lacquer printing unit or a special coating unit on the area, which is to be characterized with the safety marking (FIG. 1a) is the first step in producing the safety marking for a matte, full tone primer. For this purpose, lacquers from the oil based or varnish based printing lacquer, hybrid lacquer with UV lacquer portions or UV lacquer systems may be used. The nature of the lacquer used depends on the printing job, the drying conditions and the desired appearance of the printed area.

In a second step, the coded image elements of the safety marking are now applied with a second layer coating 3 of lesser gloss (matte gloss). Since the image structures must be transferred with a very high resolution (up to 2400 dpi, that is, approximately 10 µm per pixel) and with a high accuracy, the lacquer is applied in a printing unit using a lacquer medium suitable for this purpose. Rapid drying or at least a high viscosity of the lacquer layers 2, 3 are of decisive importance for the quality of the safety markings, so that the image contours do not run. Blurry edges reduce the informational content of the safety markings. Rapid drying can be ensured by using a rapidly curing lacquer, such as a UV lacquer, or by interim drying between applications of lacquer.

The gloss of the second lacquer layer 3 must be at least slightly different from that of the first layer 2. The gloss differences bring about the apparent brightness differences between the base surface and the lacquer structures printed with the second lacquer layer 3 due to different proportions of diffuse reflections, which were "assembled" by a decoding lens into a visible image, which appears as a brighter or darker structure on the background of the primer. In order to protect the safety marking against wear, a neutral, glossy protective or covering layer 4 of high transparency is applied over the whole surface in a third step.

Good results are achieved with a glossy oil-based printing lacquer (for example, a glossy overprinting varnish) as a first lacquer layer 2 and a matte oil-based printing lacquer for transferring the CIT image. A dispersion lacquer (water based), UV printing lacquer (applied in a printing unit used as a coating unit) or a UV lacquer (applied in a separate coating unit to form a layer of great thickness) is used as covering lacquer layer 4.

Conversely, it is also possible to apply a matte lacquer layer 3, which omits the CIT image elements so that the glossy primer remains visible at the sites, on a glossy first lacquer layer 2.

Within the scope of the invention, further variations are possible, including an already existing glossy, full tone primer 1 instead of a lacquer primer layer. For applying the CIT image, a lacquer layer 2 with the CIT image information, which has a lower degree of gloss than the full tone primer 1 (FIG. 1b), is then sufficient. In the case of this variation, the lacquer layer 3 is a protection against wear.

Figure 2A:
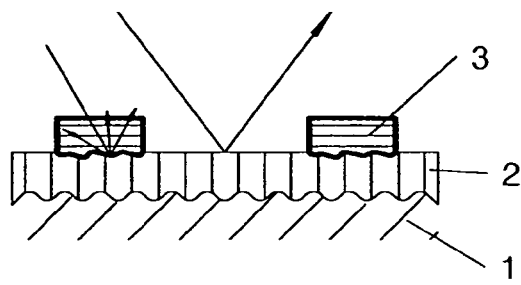
FIGS. 2a-2d show image coding with two lacquers with different surface tensions and FIGS. 3a-3b show image coding with two lacquers with absorption properties different from those of the layer of covering lacquer.

Variation 2:

For the variation shown in FIG. 2a, the lacquer is first of all applied (first lacquer layer 2) over the whole of the matte, full tone primer 1. For this variation, image elements with deviating reflection properties are produced by a sequential and locally differentiated application of two lacquer layers 2, 3 with different surface tensions, the contact surfaces of which form degrees of gloss, which differ from those of the lacquer, that is, they are produced only subsequently by the interaction of the second lacquer layer 3 with the first lacquer layer 2, which is applied as a primer. For this, the known effect is utilized that, at the interface between two lacquer layers of slightly different surface tensions, which have not been cured, deformations arise or, in the case of two lacquers of different lacquer systems, additional granulation or matting effects occur at the interface and lead to a diffuse reflection of light at the interface. Transverse stresses and physical and chemical reactions at the contact surface come into consideration as the cause and can be combined as wetting disorders. Contrary to the first variation, the diffuse light reflection does not already take place here at the surface of a matte lacquer. Instead, it takes place only at the rough interface with the first lacquer layer 2 below the matte lacquer. The use of two glossy lacquers is required for this variation.

To begin with, a lacquer layer 2, such as an oil-based printing lacquer is applied over the whole surface in a printing unit and subjected to an interim drying. The image elements of the safety marking are printed onto the first lacquer layer 2 in one of the following printing units with a lacquer printing forme containing the coded image of the safety marking. For this purpose also, a lacquer layer 3 with a different surface tension or from a different lacquer system is suitable. The interfacial effects named lead to changes in the interface of the still flowable second lacquer layer 3, which form an interfacial roughness and are fixed by the subsequent drying process. Accordingly, the lacquer surface 2, covered by the second lacquer layer 3, macroscopically appears to be a matte surface and therefore, after the decoding, appears as a brighter structure. Lacquering with a covering layer 4, such as a UV printing lacquer, as protection against wear is possible.

Similar to variation 1, the application of a lacquer layer 2 with the CIT image information and the subsequent full-surface coating with a second lacquer layer 3 in the case of a glossy full tone primer 1, is possible. In this case, the second lacquer layer 3 must have a surface tension different from that of the first lacquer coating 2, so that roughnesses and, with that, the desired diffuse reflection occur at the interfaces with the first lacquer layer 2 (FIG. 2b).

Figure 2B:
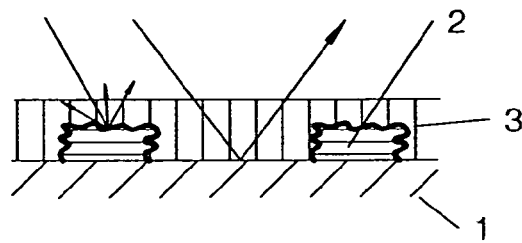
Figure 2C:
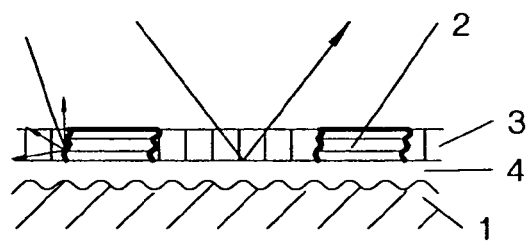
Figure 2D:
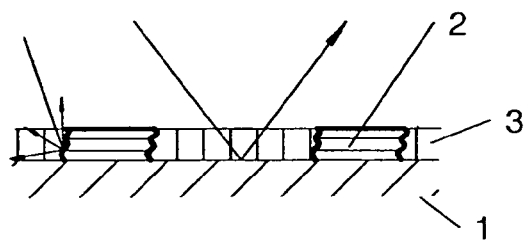

If, in further developments of the variation of FIGS. 2a and 2b, lacquer layers 2, 3 of identical thickness are applied dissected in accordance with the CIT image information, interfacial roughnesses occur only at the vertical interfaces, as a result of which additional possibilities for a 3D CIT image coating arise (FIGS. 2c and 2d).

Variation 3:

Comparable with variation 2, a further interfacial effect is utilized, which is known from the DE 100 57 641 A1, DE 100 57 642 A1 or DE 100 57 643 A1. The desired interfacial roughness and diffuse reflection is attained here by the at least partial absorption of a lacquer in a second lacquer of a different lacquer system. If, for example, a UV lacquer is applied on an oil-based printing lacquer, which has not been dried, the gloss-determining lacquer components of the UV lacquer are absorbed by the oil-base printing lacquer, as a result of which a roughness, which reflects the incident light diffusely, is formed at the interface.

Figure 3A:
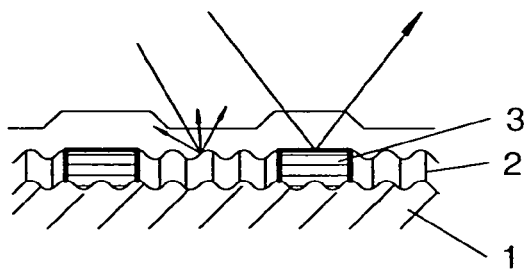

According to FIG. 3a, the safety marking is produced owing to the fact that, to begin with, a first lacquer layer 2 with an oil-based printing lacquer is applied Subsequently, the CIT image elements are applied on the first lacquer layer 2 with a rapidly curing and/or drying lacquer layer 3, such as a hybrid lacquer, by means of a printing forme. The hybrid lacquer is cured during a subsequent passage of printed material through a UV dryer, whereas the oil-based printing lacquer receives only a slight drying pulse due to the unavoidable radiation of beat from the UV dryer. Finally, a UV covering lacquer is applied over the whole surface. The freshly applied covering lacquer layer 4 is absorbed at least partially in the surface regions of the oil-based printing lacquer, which has not yet dried. That is, the covering lacquer layer 4 is absorbed by the oil-based printing lacquer layer with the development of surface roughness. In the region of the cured hybrid lacquer there is no absorption and the covering lacquer layer 4 does not react with the substrate and remains glossy. The safety marking accordingly appears as a glossy and therefore darker contour on the matte background of the absorbed covering lacquer layer 4. A similar variation for producing the safety marking is possible through the use of a hybrid lacquer as a two-dimensional first lacquer layer 2, drying by UV, printing the CIT image elements with oil-based printing lacquer and coating with a UV covering lacquer layer 4, which is then absorbed only in the region of the CIT image elements and produces matte CIT image elements.

Figure 3B:
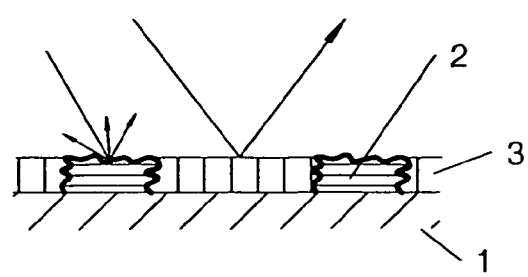

When a glossy, full tone primer 1 is used, a first lacquer layer 2 is applied with the CIT image and coated over the whole of its surface with a second lacquer layer 3 of a different lacquer system. The first lacquer layer 2 absorbs the second lacquer layer 3 and thus forms pixels with a rough surface (FIG. 3b). At the same time, the second lacquer layer 3 is a covering lacquer and protects against wear. The variations mentioned can be incorporated in multilayer lacquer layers, so that several different hidden images, which can be made visible with different decoding lenses, can be incorporated in one lacquer coating.

The lacquer coatings with the integrated CIT images can be produced inline as well as offline in a separate double lacquering machine. In order to realize the coating unit with the integrated safety markings according to the first variation, the coating unit for the two-dimensional first lacquer coating 2 and the lacquer printing unit for applying the second lacquer layer 3 should not follow one another directly, in order to ensure adequate interim drying so that the contours of the CIT image elements have the necessary sharpness. For example, full tone primers 1 for package printing can be printed in a first and second printing unit, the first lacquer layer 2 in a third unit, the lacquer printing unit, a further color in a fourth printing unit and the second lacquer layer 3 with the CIT image in a fifth unit, the lacquer printing unit. A final covering lacquer layer 4 can be applied in a sixth printing unit. After the first lacquer layer 2 is applied, interim drying with an IR dryer is advantageous. Alternatively there may be additional inking units so that the drying time is increased.

In a printing machine suitable for the inline lacquering according to variation 2, interim drying between the applications of lacquer is required only so that there is no flow of the CIT image elements of the second lacquer layer 3 into the first lacquer layer 2. Since an intorfacial reaction is to take place, the first lacquer layer 2 must have a certain residual moisture content or a specified viscosity, which depends on the particular lacquers used. If the lacquer layer 2 dries rapidly, the arrangement of one or more printing units between the printing units or coaters applying the lacquer layers is not advantageous.

According to the third variation, the physical absorption capability of, for example, an oil-based printing lacquer layer is an important prerequisite, so that advanced drying up to the application of the covering lacquer layer 4 is to he avoided. In order to ensure contour sharpness of the CIT image elements nevertheless, highly viscous lacquers are required. Due to the omission of the bonding to colored area rasters, the area of application of safety markings is enlarged significantly. The nature of the primer is almost unlimited. Special paints are also suitable as substrate. Moreover, the safety markings are not tied to certain types of printing. Screen printing, flexographic printing, gravure printing and offset printing are possible. Likewise, the spectrum of suitable lacquers is very extensive. Oil-based printing lacquers, hybrid lacquers, UV printing lacquers or UV lacquers can be used. As a result, a broad area of application opens up for the CIT safety markings For example, CD, credit cards, postage stamps, means of payment, and packaging of all types can be protected pursuant to the invention against forgeries.

What is claimed is:

1. A safety marking for printed surfaces, the safety marking being a two-dimensional or three-dimensional image, the image elements of which are coated in a size and arrangement that is below the resolving capability of the naked human eye and visible only with the help of an optical decoder lens, characterized by the coding of the image elements by locally different reflection properties of a lacquer coating formed from at least two different lacquer layers, the coding being independent of the chrominance and tonal value of the printed area.

2. The safety marking of claim 1, characterized by the coding of the image elements by means of the sequential application of a two-dimensional first lacquer layer and a second lacquer layer containing the image elements of the safety marking on the first lacquer layer, the second lacquer layer having a lesser degree of gloss or a lesser transparency than the first lacquer layer.

3. The safety marking of claim 1, characterized by the coding of the image elements by means of the sequential application of a first lacquer layer, containing the image elements of the security marking, and a two-dimensional second lacquer layer also covering the first lacquer layer, the second lacquer layer having a higher degree of gloss or a higher transparency than the first lacquer layer.

4. The safety marking of claim 1, characterized by the coding of the image elements by means of the sequential application of a two-dimensional first lacquer layer and a second lacquer layer containing the image elements of the security marking, on the first lacquer layer, the interfaces between the first and the second lacquer layers having reflection properties which deviate from the reflection properties of the first lacquer layer.

5. The safety marking of claim 1, characterized by the coding of the image elements by means of the sequential application of a first lacquer layer containing the image elements of the safety marking and a two-dimensional second lacquer layer, also covering the first lacquer layer, the interfaces between the first and second lacquer layers having reflection properties which deviate from the reflection properties of the second lacquer layer.

6. The safety marking of claim 1, wherein the at least two lacquer layers comprise two layers with different surface tensions, the interfaces between the two layers exhibiting diffuse light reflection.

7. The safety marking of claim 1, characterized by the coding of the image elements by means of the sequential application of a two-dimensional first lacquer layer and a second lacquer layer containing the image elements of the safety marking on the first lacquer layer, only the first or only the second lacquer layer absorbing at least partially a two-dimensional covering lacquer layer applied on the two lacquer layers and the absorption areas developing reflection properties, which deviate from the reflection properties of the lacquer layers.

8. The safety marking of claim 1, characterized by the coding of the image elements by means of the sequential application of a first lacquer layer containing the image elements of the security marking, and a two-dimensional second lacquer layer also covering the first lacquer layer, the first lacquer layer absorbing at least partially the second lacquer layer and the absorption surfaces developing reflection properties which deviate from the reflection properties of the lacquer layers.

9. The safety marking of claim 7, characterized by the application of dyed or colorless lacquers of different lacquer systems and with different surface tensions, whereby absorption surfaces with diffuse light reflection are formed.

10. The safety marking of claim 1, characterized by the coding of the image elements of the safety marking by the application of two lacquer layers having the same thickness and rastered according to the arrangement of the image elements, whereby an increase in the roughness setting at the vertical interfaces between the lacquer raster points of both lacquers are due to reflection or to absorption.

11. A method for the preparation of safety markings for printable surfaces, the safety marking being two-dimensional or three-dimensional image, the image elements of which are coded in a size and arrangement that is below the resolving capability of the naked human eye and visible only with the help of an optical decoder lens, characterized by:
  the preparation of a lacquer printing forme containing the coded arrangement of image elements of the safety marking,
  the application of a first and a second lacquer layer on the surface, which is to be characterized with the safety marking, one of the lacquer layers containing the coded arrangement of the image elements of the safety marking and being applied in a printing unit with the lacquer printing forme and the other lacquer layer being applied two-dimensionally,
the lacquer layers themselves having different reflection properties or, due to their interaction or due to the interaction of one of the lacquer layers with a further lacquer layer, developing locally different reflection properties at the interfaces.

* * * * *